United States Patent
Re Fiorentin et al.

(10) Patent No.: US 11,675,720 B2
(45) Date of Patent: *Jun. 13, 2023

(54) DIGITAL SIGNAL PROCESSING CIRCUIT AND CORRESPONDING METHOD OF OPERATION

(71) Applicant: STMicroelectronics S.r.l., Agrate Brianza (IT)

(72) Inventors: Lorenzo Re Fiorentin, Turin (IT); Giampiero Borgonovo, Giussano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,209

(22) Filed: Jul. 7, 2022

(65) Prior Publication Data
US 2022/0350764 A1 Nov. 3, 2022

Related U.S. Application Data

(63) Continuation of application No. 17/339,083, filed on Jun. 4, 2021, now Pat. No. 11,461,257.

(30) Foreign Application Priority Data

Jul. 7, 2020 (IT) .......................... 102020000016393

(51) Int. Cl.
*G06F 13/28* (2006.01)
*G06F 9/46* (2006.01)
(Continued)

(52) U.S. Cl.
CPC ............ *G06F 13/287* (2013.01); *G06F 9/467* (2013.01); *G06F 13/37* (2013.01); *G06F 13/372* (2013.01); *G06F 17/142* (2013.01)

(58) Field of Classification Search
CPC ........ G06F 13/287; G06F 9/467; G06F 13/37; G06F 13/372; G06F 17/142
See application file for complete search history.

(56) References Cited

U.S. PATENT DOCUMENTS 6,035,313 A 3/2000 Marchant
9,170,985 B1 10/2015 Langhammer
(Continued)

OTHER PUBLICATIONS

Richardson, Stephen et al., "Building Conflict-Free FFT Schedules" IEEE Transactions on Circuits and Systems—I: Regular Papers, vol. 62, No. 4, Apr. 2015, 10 pages.
(Continued)

*Primary Examiner* — Phong H Dang
(74) *Attorney, Agent, or Firm* — Slater Matsil, LLP

(57) ABSTRACT

An embodiment circuit comprises a plurality of processing units, a plurality of data memory banks configured to store data, and a plurality of coefficient memory banks configured to store twiddle factors for fast Fourier transform processing. The processing units are configured to fetch, at each of the FFT computation stages, input data from the data memory banks with a burst read memory transaction, fetch, at each of the FFT computation cycles, different twiddle factors in a respective set of the twiddle factors from different coefficient memory banks of the coefficient memory banks, process the input data and the set of twiddle factors to generate output data, and store, at each of the FFT computation stages, the output data into the data memory banks with a burst write memory transaction.

20 Claims, 3 Drawing Sheets

(51) Int. Cl.
   *G06F 13/37* (2006.01)
   *G06F 13/372* (2006.01)
   *G06F 17/14* (2006.01)

(56) References Cited

U.S. PATENT DOCUMENTS

| | | | |
|---|---|---|---|
| 11,461,257 B2* | 10/2022 | Re Fiorentin | G06F 13/287 |
| 2015/0113030 A1 | 4/2015 | Chowdhury et al. | |
| 2015/0242365 A1 | 8/2015 | Lu et al. | |
| 2016/0132461 A1 | 5/2016 | Tinker et al. | |
| 2017/0149589 A1* | 5/2017 | Kim | G06F 17/142 |
| 2018/0253399 A1* | 9/2018 | Jacob | H04L 27/2651 |
| 2020/0178195 A1 | 6/2020 | Dinan | |
| 2020/0319296 A1 | 10/2020 | Gupta et al. | |
| 2021/0318869 A1 | 10/2021 | Cathebras et al. | |
| 2021/0334334 A1 | 10/2021 | Cathebras et al. | |

OTHER PUBLICATIONS

Xiao, Xin et al., "Low-Power Memory Addressing Scheme for Fast Fourier Transform Processors", IEEE 52nd IEEE International Midwest Symposium on Circuits and Systems, Aug. 2-5, 2009, 4 pages.

Jui, Ping-Chang et al., "Low-Cost Parallel FFT Processors with Conflict-Free ROM-Based Twiddle Factor Generator for DVB-T2 Applications," IEEE 56th International Midwest Symposium on Circuits and Systems (MWSCAS), Columbus, OH, Aug. 4-7, 2013, pp. 1003-1006, doi: 10.1109/MWSCAS.2013.6674821.

Kitsakis, V., et al., "Parallel Memory Accessing for FFT Architectures", Journal of Signal Processing Systems, 90:1593-1607, Jun. 12, 2018.

Sohi, Gurindar Singh, "High-Bandwidth Interleaved Memories for Vector Processors—A Simulation Study", IEEE Transactions on Computers, vol. 42, No. 1, Jan. 1993, doi: 10.1109/12.192212, 11 pages.

* cited by examiner

DIGITAL SIGNAL PROCESSING CIRCUIT AND CORRESPONDING METHOD OF OPERATION

CROSS-REFERENCE TO RELATED APPLICATIONS

This application is a continuation of U.S. patent application Ser. No. 17/339,083, filed Jun. 4, 2021, which application claims the priority benefit of Italian Application No. 102020000016393, filed on Jul. 7, 2020, which applications are hereby incorporated herein by reference.

TECHNICAL FIELD

The description relates to digital signal processing circuits such as fast Fourier transform (FFT) processors, and associated methods.

BACKGROUND

Modern wideband communication systems based on Orthogonal Frequency Division Multiplexing (OFDM), such as Digital Video Broadcasting (DVB) and Digital Audio Broadcasting (DAB), or modern radar systems (as increasingly used, for instance, in the automotive sector) are exemplary of processing systems which involve the computation of fast Fourier transforms (FFTs) whose length (or size) can reach up to 8192 points, or even more.

Computation of fast Fourier transforms can be carried out by hardware-implemented FFT processors. A FFT processor may comprise one or more processing elements (PE), for instance radix-2 butterfly processing elements, and one or more read-only memories (ROM). The read-only memories in the FFT processor may be configured to store twiddle factors for fast Fourier transform computation.

In the case of long FFT algorithms which involve a high number of different twiddle factors, the ROM memories may represent a significant portion of the entire FFT processor (e.g., in terms of occupied silicon area).

The ROM memories may represent a significant portion of the FFT processor especially if the FFT processor relies on the use of parallel computation, i.e., in case the FFT processor comprises a plurality of processing elements and a respective plurality of ROM memories coupled thereto.

The twiddle factors are usually stored (e.g., hard-wired) in the ROM memories and retrieved for butterfly multiplication by means of ROM address generators (RAG) implemented inside the processing elements. The ROM address generators may provide the memory address where a required twiddle factor is stored.

If a plurality of processing elements is used in a FFT processor for parallel computation, a plurality of ROM lookup tables may be provided in the FFT processor (e.g., one dedicated ROM memory for each processing element) in order to avoid memory access conflicts when the processing elements access the ROM memories to fetch the twiddle factors.

Alternatively, complex conflict-free access schemes may be implemented, e.g., as disclosed by P. Jui, C. Wey and M. Shiue, *"Low-cost parallel FFT processors with conflict-free ROM-based twiddle factor generator for DVB-T2 applications,"* 2013 IEEE 56th International Midwest Symposium on Circuits and Systems (MWSCAS), Columbus, Ohio, 2013, pp. 1003-1006, doi: 10.1109/MWSCAS.2013.6674821.

SUMMARY

An object of one or more embodiments is to contribute in providing a FFT processor having an efficient architecture for twiddle factor index generation (e.g., twiddle factor storage and fetching), e.g., in terms of trade-off between silicon area occupation and performance.

According to one or more embodiments, such an object can be achieved by means of a circuit (e.g., a digital signal processor) having the features set forth in the claims that follow.

One or more embodiments may relate to a corresponding method of operating the circuit.

The claims are an integral part of the technical teaching provided herein in respect of the embodiments.

One or more embodiments may rely on an advantageous scheme for storing twiddle factors in a ROM memory which may facilitate reducing the dimension of the ROM memory while avoiding memory access conflicts.

One or more embodiments may provide a corresponding ROM address generator which co-operates with a ROM controller circuit for fetching the twiddle factors from the ROM memory.

According to one or more embodiments, a circuit is provided which may comprise a plurality of processing units comprising a number P of processing units, a plurality of data memory banks configured to store data, and a plurality of coefficient memory banks configured to store twiddle factors for fast Fourier transform, FFT, processing. The plurality of coefficient memory banks may comprise a number P of coefficient memory banks equal to the number P of processing units.

The circuit may be configured to apply fast Fourier transform processing having a size N, in the form $N=2^n$ with n being an integer, to the data stored in the data memory banks. Applying fast Fourier transform processing having a size N may comprise processing the data in a plurality of FFT computation stages comprising a number n of FFT computation stages. Each FFT computation stage may comprise a number of FFT computation cycles.

The processing units may be configured to fetch (e.g., at each of the FFT computation stages) input data from the data memory banks with a burst read memory transaction, fetch (e.g., at each of the FFT computation cycles) a respective set of twiddle factors from the coefficient memory banks, process the input data and the set of twiddle factors to generate output data, and store (e.g., at each of the FFT computation stages) the output data into the data memory banks with a burst write memory transaction.

The processing units may be configured to fetch, at each of the FFT computation cycles, different twiddle factors in the respective set of twiddle factors from different coefficient memory banks.

One or more embodiments may thus provide efficient twiddle factor index generation.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The headings/references used herein are provided merely for convenience and hence do not define the extent of protection or the scope of the embodiments.

Figure 1:
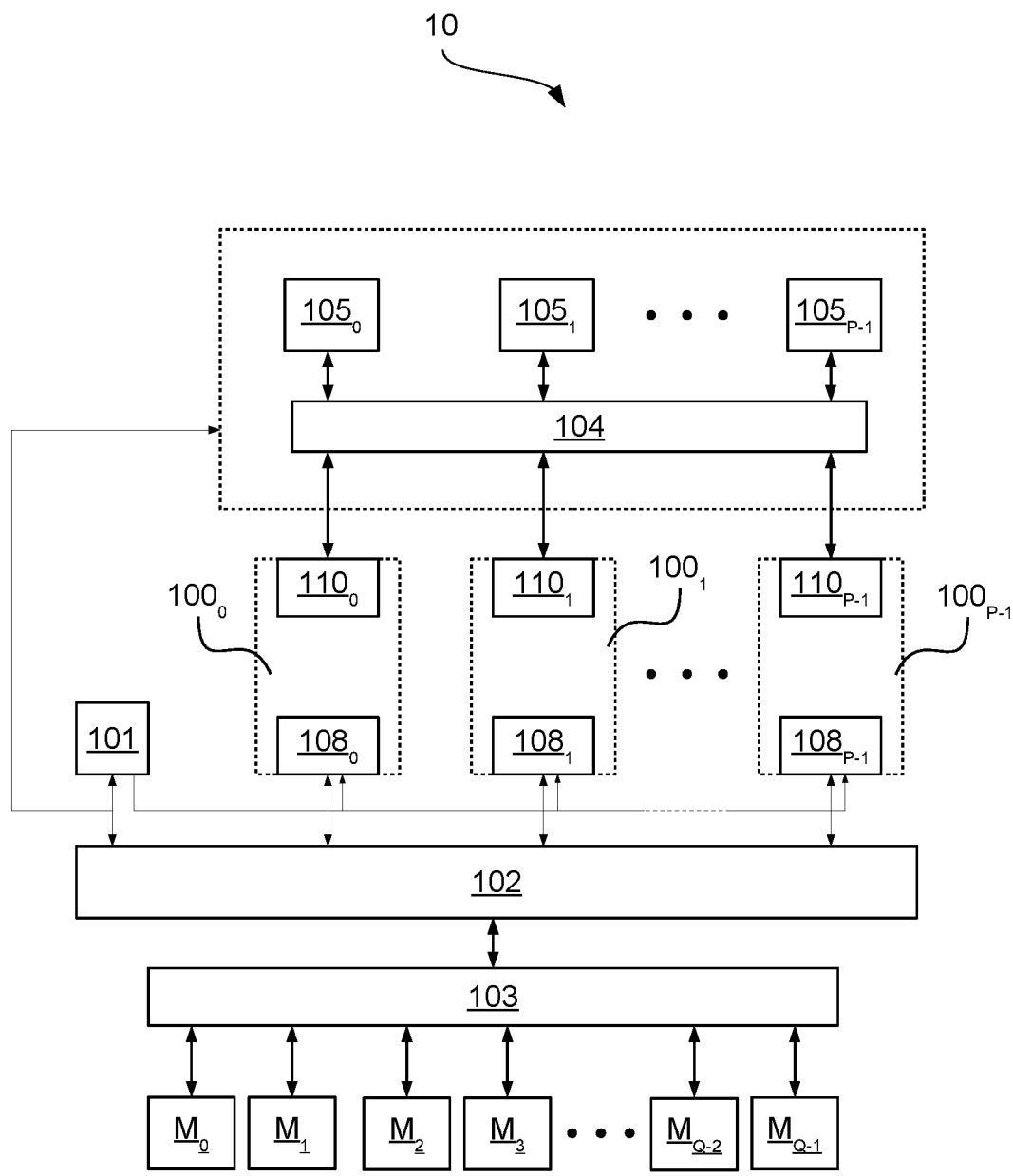
FIG. 1 is a circuit block diagram exemplary of a fast Fourier transform processor circuit according to one or more embodiments of the present description.

FIG. 1 is a circuit block diagram exemplary of the architecture of a parallel memory-based fast Fourier transform (PMBFFT) processor 10.

A parallel memory-based FFT processor 10 as illustrated in FIG. 1 is suitable to be integrated in an electronic system such as a system-on-chip (SoC) for use in a vehicle such as a motor car, e.g., in order to process digital signals collected by one or more sensors (e.g., a radar sensor) provided in the vehicle.

As exemplified in FIG. 1, the parallel memory-based FFT processor 10 comprises a plurality (e.g., a number P) of processing elements $100_0, 100_1, \ldots, 100_{P-1}$, (e.g., radix-2 butterfly processing elements), a plurality (e.g., a number Q=2*P) of local data memory banks $M_0, \ldots, M_{Q-1}$ and a plurality (e.g., a number P) of local read-only memory banks $105_0, 105_1, \ldots, 105_{P-1}$.

For simplicity, throughout the present description:

reference numeral 100 may be used to collectively designate the processing elements $100_0, 100_1, \ldots, 100_{P-1}$, reference numeral 105 may be used to collectively designate the local read-only memory banks $105_0, 105_1, \ldots, 105_{P-1}$, reference M may be used to collectively designate the local data memory banks $M_0, \ldots, M_{Q-1}$, and terms such as "FFT length", "transform length", "FFT size" are used to designate the size (e.g., 4096 points, 8192 points or even more) of the FFT transform.

Additionally:

throughout the figures annexed herein, like parts or elements are indicated with like references/numerals and a corresponding description will not be repeated for brevity, in order to avoid disrupting the presentation, various tables numbered I to VIII referred to in the description are grouped at the end of the description.

As illustrated in FIG. 1, a parallel memory-based FFT processor 10 may comprise a local control unit 101, a local data memory controller 103 coupled to the local data memory banks M, and a local ROM controller 104 coupled to the local read-only memory banks 105.

A local interconnect network 102 may be provided to couple the local control unit 101, the processing elements 100 and the local data memory controller 103.

The local interconnect network 102 may also provide connection to a system control unit (e.g., a microprocessor unit or a microcontroller unit), not visible in the Figures annexed herein. The system control unit may be used to configure the FFT processor 10 and may trigger start of the FFT algorithm computation. Additionally, the connection to the system control unit may be used to upload data into local data memory banks M.

Different embodiments may comprise a different number P of processing elements 100 and local read-only memory banks 105, and/or a different number Q of local data memory banks M. Purely by way of non-limiting example, P may be equal to 8 and Q may be equal to 16.

In one or more embodiments, the processing elements wo comprise respective internal direct memory access (DMA) controllers $108_0, 108_1, \ldots, 108_{P-1}$ (collectively designated with reference numeral 108) configured to interface the processing elements boo to the local data memory banks M via the local data memory controller 103.

In one or more embodiments, the local data memory controller 103 may be configured to arbitrate access (e.g., by the processing elements 100) to the local data memory banks M.

The processing elements 100 as exemplified herein are configured to retrieve input data from the local data memory banks M through the respective DMA controllers 108, as directed by the local control unit 101. The processing elements may thus elaborate the retrieved input data to generate processed output data, with such elaboration involving the use of twiddle factors fetched from the ROM memory banks 105. The processing elements are configured to write the processed output data in the local data memory banks M through the respective DMA controllers 108.

In one or more embodiments, the local data memory controller 103 may translate input read/write transaction bursts (e.g., AXI bursts) generated by the read/write DMA controllers 108 into a sequence of read/write memory accesses, according to a specified burst type, burst length and memory access scheme.

In one or more embodiments, providing a set of local data memory banks M may facilitate processing data in parallel and reducing memory access conflicts.

Optionally, the local data memory banks M may be provided with buffering (e.g., double buffering) which may facilitate recovering the memory upload time (write operation) and/or download time (read operation). In particular, each local data memory bank may be duplicated, so that data can be read (e.g., for being processed) from one of the two memory banks and (new) data can be stored (e.g., for being processed later) in the other memory bank at the same time. As a result, moving data may not negatively affect computation performance, as it may be masked.

In one or more embodiments, a double buffering scheme of the local data memory banks M may be advantageous in combination with data processing in streaming mode or back to back (e.g., as applicable to a FFT N-point processor that is configured to elaborate continuous sequences of N data inputs).

In one or more embodiments, the local data memory banks M may comprise memory banks having a limited storage capacity (and thus, a limited silicon footprint). For instance, each of the local data memory banks may have a storage capacity of at least (maxN)/Q, where maxN is the longest FFT that the hardware processor is able to handle. Typical values in applications that involve a memory-based FFT processor may be N=4096 points, with each point being, for instance, a floating-point single precision complex number (real, img) having a size of 64 bits (or 8 bytes), and P=8 resulting in Q=16, so that the storage capacity of each local data memory bank may be equal to (4096*8 bytes)/16=2 KB (KB=kilobyte).

In one or more embodiments, the local read-only memory banks 105 accessible by the processing elements wo via the local ROM controller 104 are configured to store twiddle factors for FFT computation.

In one or more embodiments, the processing elements 100 comprise respective internal ROM address generator (RAG) circuits $100_0, 110_1, \ldots, 100_{P-1}$ (collectively designated with reference numeral no) configured to interface the processing elements wo to the local ROM memory banks 105 via the local ROM controller 104. The processing elements 100 may be configured to retrieve input data (e.g., twiddle factors) from the local ROM memory banks 105 to perform FFT processing.

In one or more embodiments, the local read-only memory is advantageously split into a number P of ROM memory banks 105 equal to the number P of processing elements 100 comprised in the FFT processor 10. This may facilitate avoiding conflicts during parallel computations.

As anticipated, storage and/or retrieval of twiddle factors (TFs) is a relevant aspect in the design of parallel memory-based FFT processors, in particular in case computation of FFTs with large transform lengths (e.g., 4096 points, 8192 points or more) is involved.

Therefore, one or more embodiments aim at providing a hardware-implemented, highly-performant solution for a ROM-based twiddle factor generator circuit.

In one or more embodiments, the radix-2 butterfly processing elements wo may share the local ROM controller 104 and a same ROM lookup table, split into different banks (e.g., with the number of ROM banks 105 equal to the number of processing elements 100).

The burst-based FFT processing implemented by the internal DMA controllers 108 of the processing elements 100 and the ROM access scheme implemented by the local ROM controller 104 facilitate avoiding conflicts during the FFT computation, also reducing the cost in terms of hardware resources.

The circuit architecture exemplified in FIG. 1, with only one ROM lookup table comprising a number N/2 of words equally partitioned into a number P of different banks 105 (with each ROM bank storing a number of words equal to N/(2*P)), may improve the processing throughput.

Table I annexed to the present description is exemplary of possible values of the architectural parameters.

In one or more embodiments, data bursts may be issued by the internal read/write DMA controllers 108 of the processing elements wo according to a selected length N of the fast Fourier transform (for instance, the length N may be configurable by software, with the only constraint of being a power of 2, i.e., in the form $N=2^n$). As a function of the number P of processing elements in the parallel FFT processor 10 and of the selected length N, the burst length LENGTH and stride STRIDE at each FFT computation stage may be defined, as exemplified in Table II annexed to the present description.

For instance, as exemplified in Table II, the value LENGTH of the burst length may be equal to N/(2*P) for all stages of FFT computation. Also as exemplified in Table II, the value STRIDE of the burst stride may be equal to P in the first computation stage (e.g., Stage 0), and may be right-shifted at each subsequent computation stage. For instance, in the second computation stage (e.g., Stage 1) the value STRIDE may be equal to P>>1 (i.e., the value P right-shifted by one position) and in the last computation stage (e.g., Stage n−1) the value STRIDE may be equal to P>>n−1 (i.e., the value P right-shifted by n−1 positions, which returns the value 2*P because the value STRIDE is stored in a circular right shift register of n bits).

Control and programming of the DMA controllers 108 may be handled by the local control unit 101, e.g., using simple circular right-shift registers (e.g., for controlling the burst stride a circular right-shift register on n bits may be used) which may be initialized (only) at the start of the FFT computation, according to the selected length N, and then updated at the start of each computation stage.

Table II annexed to the present description is also exemplary of how the read/write bursts may be programmed at each FFT stage for each instantiated processing element 100 (PE #i) when a fast Fourier transform of length N is computed.

In one or more embodiments, adopting a burst-based data processing scheme for FFT computation facilitates implementing a simple ROM-based twiddle factor generator (e.g., managing ROM bank address generation and ROM handling) which facilitates avoiding memory access conflicts when a number $P=2^p$ of radix-2 butterfly units or processing elements are used in parallel for computing a FFT of length $N=2^n$.

One or more embodiments may thus provide a significant hardware simplification (e.g., in terms of ROM addresses generation and access scheme) with respect to known solutions. Additionally, one or more embodiments may rely on using only a simple ROM lookup table of N/2 words equally partitioned into a number P of sub-tables.

Italian patent application 102020000009364 filed by the same Applicant (and not yet available to the public at the time of filing of the instant application) discloses an efficient way to extend standard buses to support vector accesses with a programmable stride and memory access scheme to the local memory banks M, and how such a solution can be exploited to realize high-performance parallel memory-based FFT processors.

It is noted that organizing in single bursts the data memory accesses for each radix-2 processing element input/output during each FFT stage in the way exemplified in Table II facilitates defining a simple and efficient architectural scheme for the twiddle factor generator.

For instance, Tables III, IV and V annexed to the present description are exemplary of the twiddle factors Wi that each processing element 100 retrieves from the ROM memory banks 105 at the various stages and cycles of FFT computation in case a burst-based scheme as exemplified in Table II is used by the DMA controllers 108 to access the data stored in the memory banks M, wherein:

$$W_i = e^{-\frac{2\pi i}{N}j} \quad (1)$$

-continued $$X_k = \sum_{n=0}^{N-1} x_n W_N^{nk} \quad (2)$$

Equation (i) above allows computing the values of the twiddle factors Wi to be stored in the ROM memory banks 105 (with index i ranging from 0 to N/2-1, e.g., from 0 to 31 in the exemplary case of N=64). Equation (2) above is exemplary of the general Discrete Fourier Transform (DFT) equation.

Purely by way of non-limiting example:

Table III indicates the twiddle factors Wi that each processing element (PE) retrieves from the ROM memory banks 105 at the various stages and cycles of FFT computation in the case of N=64 and P=8, Table IV indicates the twiddle factors Wi that each processing element (PE) retrieves from the ROM memory banks 105 at the various stages and cycles of FFT computation in the case of N=32 and P=8, and Table V indicates the twiddle factors Wi that each processing element (PE) retrieves from the ROM memory banks 105 at the various stages and cycles of FFT computation in the case of N=32 and P=4.

It is noted that the twiddle factors listed in a same row of any of the Tables III, IV and V are retrieved by the processing elements at the same clock cycle. Therefore, they may advantageously be stored in different ROM memory banks if their index i is different.

In one or more embodiments, use of a burst-based data processing solution may facilitate managing ROM memory conflicts.

One or more embodiments may rely on the recognition that storing a number N/2 of twiddle factors in the ROM memory banks 105 in a way that avoids conflicts in the first FFT computation stage (e.g., Stage 0) may result in conflicts being avoided in all the following FFT computation stages. In fact, the twiddle factors involved during the cycles of computation stages which follow the first computation stage (i.e., computation stages having an index greater than 0, e.g., Stage 1 to Stage n−1) may be selected as a subset of the twiddle factors that are read from the ROM memory banks 105 during the cycles of the first computation stage (e.g., Stage 0), as exemplified in Table III, Table IV and Table V.

In one or more embodiments, storing a number N/2 of twiddle factors in the ROM memory banks 105 in a way that avoids conflicts in the first FFT computation stage may rely on a low-order or standard interleaving scheme as disclosed by G. S. Sohi, "High-bandwidth interleaved memories for vector processors—A simulation study," IEEE Transactions on Computers, vol. 42, no. 1, pp. 34-44, January 1993, doi: 10.1109/12.192212.

For instance, Table VI annexed to the present description is exemplary of a possible scheme for storing the twiddle factors Wi into a number P of different ROM memory banks 105 in a way that avoids conflicts in the first FFT computation stage. It is noted that each ROM memory bank $105_i$ (with index i ranging from 0 to P−1) may comprise a number of rows equal to N/(2*P). The row numbered j (with index j ranging from 0 to N/(2*P)−1) of the ROM memory bank numbered i may be configured to store the twiddle factor having index i+jP. Therefore, in a generic ROM memory bank numbered i, the first row having index j=0 may store the twiddle factor Wi, an intermediate row having generic index j may store the twiddle factor Wi+jP, and the last row having index j=N/(2*P)−1 may store the twiddle factor Wi+(N/2)−P.

Therefore, a number N/2 of twiddle factors (labeled from Wo to W(N/2−1)) can be stored without repetition in the ROM memory banks 105 while allowing access conflicts to be avoided. According to the storage scheme described above, a single instance of each twiddle factor Wi may be stored into the ROM memory banks 105 without jeopardizing the possibility of accessing the twiddle factors without conflicts, even in the case of parallel FFT computation, insofar as a conflict might occur (only) when two different processing elements 100 request access, in the same clock cycle, to two twiddle factors having different indexes stored in a same ROM memory bank 105.

Two (or more) different processing elements trying to access the same twiddle factor in the same clock cycle do not generate a conflict, insofar as the ROM controller 104 may be configured to merge two (or more) incoming requests for access to a same twiddle factor by two (or more) different processing elements into a single ROM access, and to deliver back the read value to the requesting processing elements.

Figure 2:
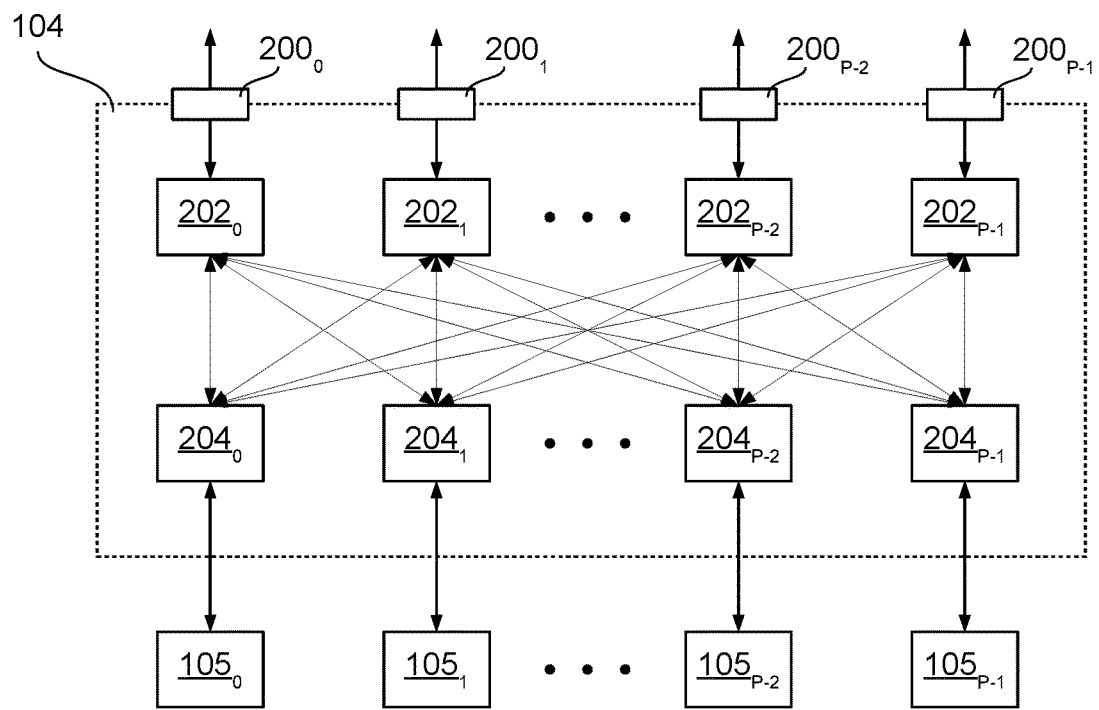
FIG. 2 is a circuit block diagram exemplary of a ROM controller circuit according to one or more embodiments of the present description.

FIG. 2 is a circuit block diagram exemplary of an internal architecture of a ROM controller 104 according to one or more embodiments.

As exemplified in FIG. 2, the ROM controller 104 may comprise a number P of ports $200_0, 200_1, \ldots, 200_{P-2}, 200_{P-1}$ (collectively designated with reference numeral 200) configured for coupling to a respective number P of RAG circuits no provided in the processing elements 100. The ports 200 may be coupled to respective dispatcher circuits $202_0, 202_1, \ldots, 202_{P-2}, 202_{P-1}$ (collectively designated with reference numeral 202). The ROM controller 104 may additionally comprise a number P of merging stages $204_0, 204_1, \ldots, 204_{P-2}, 204_{P-1}$ (collectively designated with reference numeral 204). The dispatcher circuits 202 and the merging stages 204 may be fully connected, i.e., each dispatcher circuit 202 may be connected to all the merging stages 204, as exemplified in FIG. 2.

In one or more embodiments, the dispatcher circuits 202 may be configured to implement a low-order interleaving scheme.

In one or more embodiments, the merging stages 204 may be configured to merge two (or more) incoming requests for access to a same twiddle factor by two (or more) different processing elements into a single ROM memory access.

Figure 3:
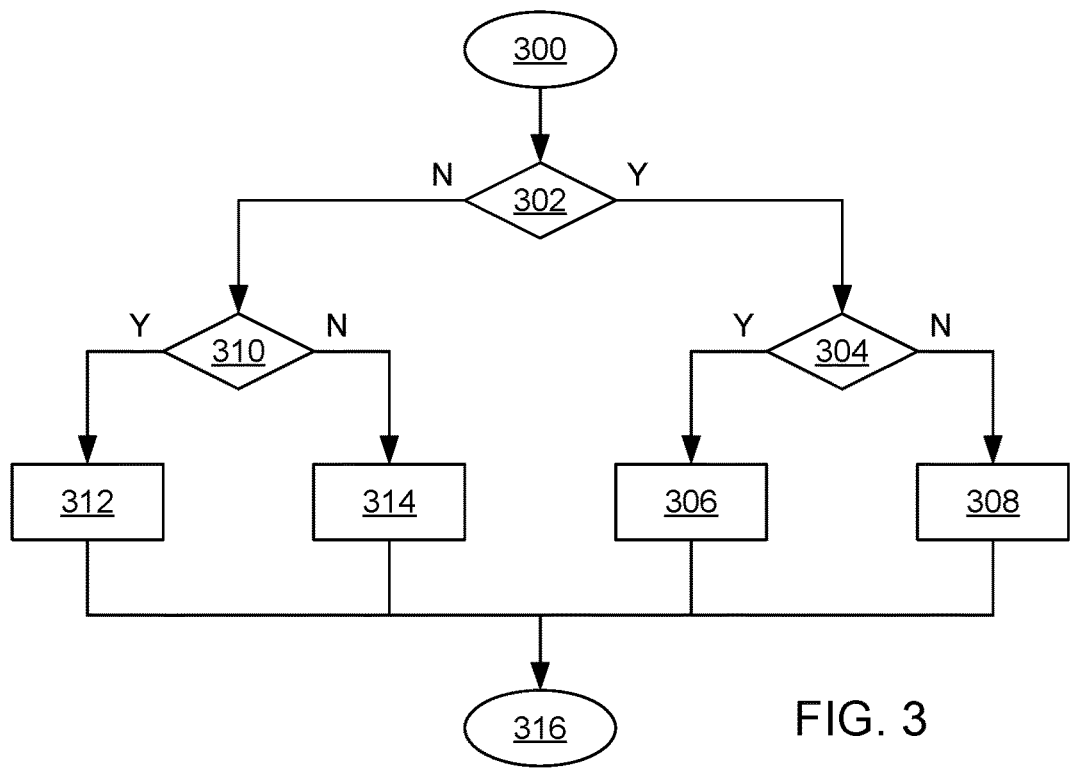
FIG. 3 is a flow diagram exemplary of a procedure for computing twiddle factor indexes for FFT processing.

In one or more embodiments the indexes of the twiddle factors retrieved by each processing element 100 during FFT computation, in case a burst-based scheme as exemplified in Table II is adopted, may be computed according to a procedure as exemplified in FIG. 3. Such a procedure may be run, for instance, by the local control unit 101 in co-operation with the RAG circuits no.

At a step 300, the computation of the twiddle factor indexes may start.

A following step 302 may comprise checking whether the current value of a variable stage (which is initialized at zero and counts up to n−1, where n=$\log_2 N$ and N is the length of the computed FFT algorithm) is lower than or equal to a value p, wherein p=$\log_2 P$ and P is the number of processing elements 100 in the FFT processor (e.g., with the constrain of being a power of 2).

As a result of a positive outcome (Y) of step 302, a following step 304 may comprise dividing the number i (which identifies a currently considered processing element 100, with i ranging from 0 to P−1) by number $2^{stage}$ and checking whether the remainder of the division is equal to zero.

As a result of a positive outcome (Y) of step 304, a following step 306 may comprise computing the index of the twiddle factor currently (i.e., at a certain cycle of a certain stage of the FFT computation) required by processing element i according to the formula $index_i=i+cycle*P$, wherein cycle is a variable which is initialized at zero at the beginning of each FFT stage and counts up to $N/(2P)-1$.

As a result of a negative outcome (N) of step 304, a following step 308 may comprise computing the index of the twiddle factor currently (i.e., at a certain cycle of a certain stage of the FFT computation) required by processing element i according to the formula $index_i=index_{i-1}$, i.e., the processing element numbered i may require the same twiddle factor required by the processing element numbered i-1.

As a result of a negative outcome (N) of step 302, a following step 310 may comprise dividing the number cycle by number $2^{stage-p}$ and checking whether the remainder of the division is equal to zero.

As a result of a positive outcome (Y) of step 310, a following step 312 may comprise computing the index of the twiddle factor currently required by processing element i according to the formula $index_i=cycle*P$. In other words, all the processing elements 100 may access the same twiddle factor simultaneously, with the index of the twiddle factor depending (only) on the current cycle and on the number P of processing elements.

As a result of a negative outcome (N) of step 310, a following step 314 may comprise computing the indexes of the twiddle factors currently required by all the processing elements by retaining the same indexes computed at the previous computation cycle.

At a step 316, the computation of the twiddle factor indexes may end.

The procedure exemplified in FIG. 3 (blocks 300 to 316) may be repeated at each cycle of each stage of the FFT computation.

In one or more embodiments, a procedure as exemplified in FIG. 3 may be hardware-implemented by the RAG circuits no of the processing elements 100, driven by control signals provided by the local control unit 101.

Figure 4:
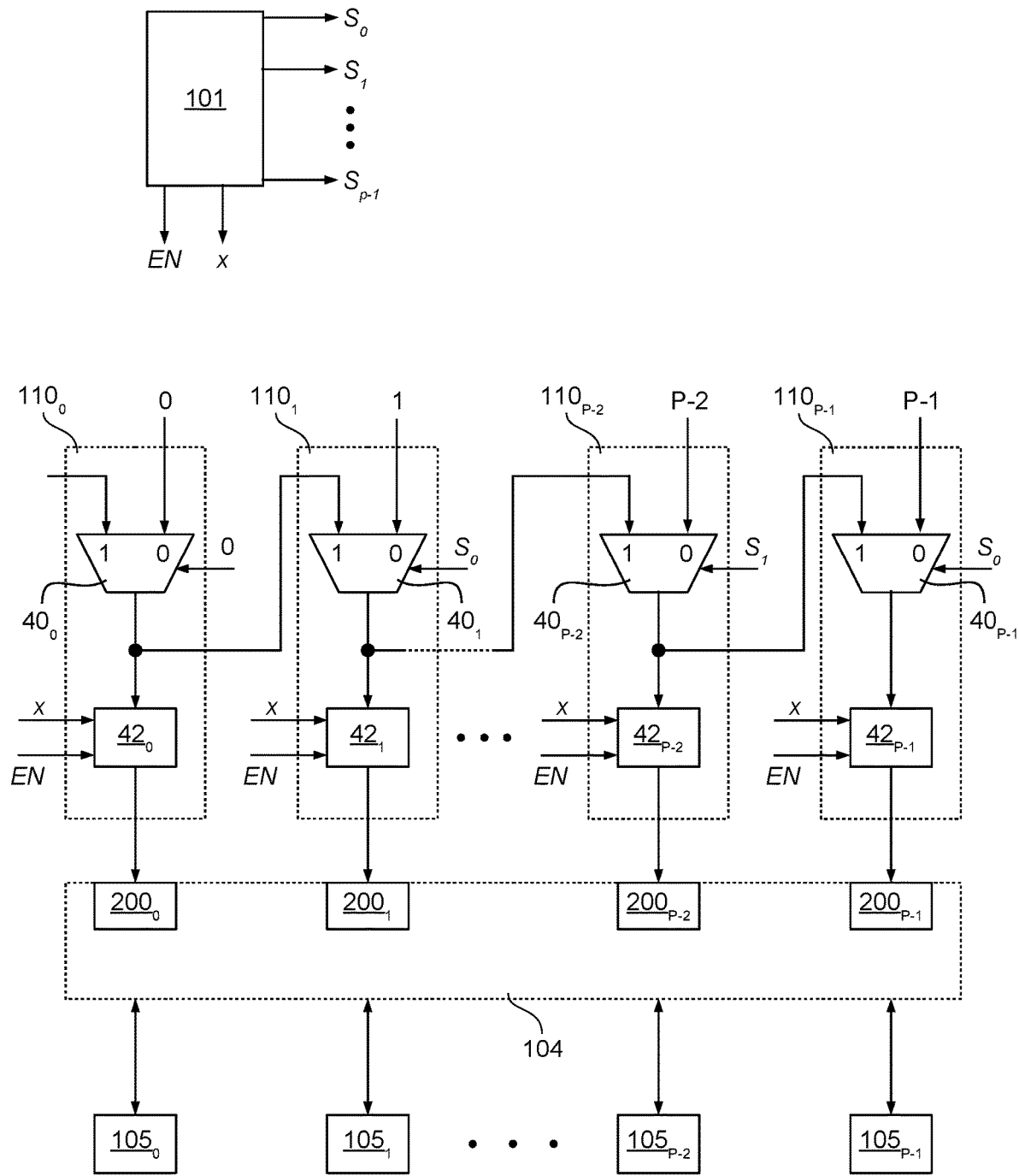
FIG. 4 is a circuit block diagram exemplary of implementation details of a ROM address generator circuit according to one or more embodiments of the present description.

FIG. 4 is a circuit block diagram exemplary of a possible implementation of the RAG circuits no according to one or more embodiments. The RAG circuits no may be ideally ordered from a first RAG circuit having index i=0, comprised in a first processing element moo, to a last RAG circuit having index i=P-1, comprised in a last processing element $100_{P-1}$.

Each RAG circuit no may comprise a respective multiplexer circuit 40 and a respective configurable power-of-2 counter circuit 42 coupled at the output of the multiplexer circuit. Each counter circuit 42 may be configured to output a twiddle factor index required by the respective processing element at a certain stage and cycle of FFT processing, with such twiddle factor index being passed to a respective port 200 of the ROM controller circuit 104.

Each multiplexer circuit 40 comprises a first input configured to receive (e.g., if the respective selection signal is equal to 1) the value provided at the output of the preceding multiplexer circuit in the ordered sequence of multiplexer circuits (e.g., to implement a daisy-chain connection), and a second input configured to receive (e.g., if the respective selection signal is equal to 0) a binary value corresponding to the position of the multiplexer circuit in the ordered sequence (i.e., starting from 0 for the first multiplexer circuit $40_0$ to P-1 for the last multiplexer circuit $40_{P-1}$).

Each multiplexer circuit 40 is controlled by a bit $S_0, \ldots, S_{p-1}$ of a selection signal S provided by the local control unit 101 (e.g., with $S_0$ being the least significant bit and $S_{p-1}$ being the most significant bit). The selection signal S may thus be a signal comprising a number $p=\log_2 P$ of bits.

In particular, a multiplexer circuit 40 having index i (with i ranging from 0 to P-1) may be configured to receive the j-th bit $S_j$ of the selection signal, provided that the remainder of the division $i/2^j$ is zero and j is the highest integer satisfying the condition. Table VII and Table VIII annexed to the present description are exemplary of possible association of the bits of the selection signal S to the respective ordered multiplexer circuits $40_0, 40_1, \ldots, 40_{P-2}, 40_{P-1}$ in the exemplary cases of P=8 and P=16, respectively.

In one or more embodiments, the first multiplexer circuit $40_0$ may be configured to receive a fixed selection signal (e.g., 0) so that the input of the first multiplexer circuit $40_0$ is stuck at the value zero. Alternatively, the first RAG circuit $110_0$ may not be provided with a respective multiplexer circuit, and the value zero may be directly provided at the input of the respective counter circuit $42_0$. It is noted that providing a first multiplexer circuit $40_0$ having a fixed selection signal may be advantageous insofar as the multiplexer circuits 40 may be present by default in the instantiated RAG circuits 110, and thus also in the first processing element $100_0$.

Each configurable power-of-2 counter 42 may receive from the local control unit 101 an enable signal EN and a configuration signal x which determines the offset of the power-of-2 counter, e.g., according to the formula $2^x-P$. In one or more embodiments, when the counter enable signal EN is asserted (e.g., equal to 1), the new incremented value is output by the counter circuit 42 and stored inside the status register at the next clock cycle. At the active edge of the clock signal, the counter register value is updated according to the previous value and the programmed offset.

Therefore, the RAG circuits 110 implemented in the processing elements 100 may be configured to generate the twiddle factor requests at the ports $200_0$ to $200_{P-1}$ of the ROM controller 104 according to the logic exemplified in Tables III, IV or V.

In addition to driving the configuration signals for the internal DMA controllers 108, the internal control unit 101 of the FFT processor 10 is configured to drive the selection bits $S_0, \ldots, S_{p-1}$ for the RAG multiplexer circuits 40, and the enable signal EN and the configuration signal x for the counter circuits 42. The values of such signals change from one stage to another and/or from one cycle to another in order to implement the procedure exemplified in FIG. 3.

The following rules may be applied by the control unit 101 for generating the selection signal S:

the bits $S_0, \ldots, S_{p-1}$ of the selection signal S may be initially (e.g., during the first FFT computation stage) set to zero, so that none of the multiplexer circuits 40 is daisy-chained to another, as a result of the variable stage being lower than or equal top (see, e.g., steps 304, 306 and 308 in FIG. 3), the bits $S_0, \ldots, S_{p-1}$ of the selection signal S may be updated at each stage of the FFT computation by bitwise-ORing a previous value of the selection signal S with a signal STAGE carrying a 1 at the bit whose index is equal to the previous stage value, and as a result of the variable stage being higher than p, the bits $S_0, \ldots, S_{p-1}$ of the selection signal S may be set to one so that all the multiplexer circuits 40 are daisy-chained.

Purely by way of example, considering a three-bit selection signal S and a three-bit signal STAGE, as a result of the variable stage being lower than or equal to p the selection signal S may be generated as follows:
if stage=0→S=000;
if stage=1→STAGE=001, S=000 OR 001=001;
if stage=2→STAGE=010, S=001 OR 010=011;
if stage=3→STAGE=100, S=011 OR 100=111.

The following rules may be applied by the control unit 101 for generating the counter enable signal EN and the counter configuration signal x:

as a result of the variable stage being lower than or equal top (see, e.g., steps 304, 306 and 308 in FIG. 3), the enable signal EN may be asserted (e.g., EN=1) and the configuration signal x may be equal to zero, as a result of the variable stage being higher than p and the remainder of the division cycle/$2^{stage-p}$ being equal to zero (see, e.g., step 312 in FIG. 3), the enable signal EN may be asserted (e.g., EN=1) and the configuration signal x may be equal to stage-p, and as a result of the variable stage being higher than p and the remainder of the division cycle/$2^{stage-p}$ being different from zero (see, e.g., step 314 in FIG. 3), the enable signal EN may be de-asserted (e.g., EN=0) and the configuration signal x may be equal to stage-p.

One or more embodiments may thus improve storage and retrieval of twiddle factors in the ROM memory 105 of a FFT hardware processor. In one or more embodiments, the ROM memory may have a depth of only N/2 words equally divided in P banks for use with a parallel memory-based FFT processor, and may facilitate avoiding data conflicts during the FFT computation.

One or more embodiments may support variable FFT lengths N. For instance, the hardware FFT processor 10 may be designed to support a determined maximum FFT length (e.g., N=8192 points), with shorter lengths being selectable by software.

As exemplified herein, a circuit (e.g., 10), for instance a digital signal processor, may comprise a plurality of processing units (e.g., $100_0, \ldots, 100_{P-1}$) comprising a number P of processing units (e.g., radix-2 butterfly processing units), a plurality of data memory banks (e.g., $M_0, \ldots, M_{Q-1}$) configured to store data, and a plurality of coefficient memory banks (e.g., $105_0, \ldots, 105_{P-1}$) configured to store twiddle factors for fast Fourier transform, FFT, processing (e.g., read-only memory banks). The plurality of coefficient memory banks may comprise a number P of coefficient memory banks equal to the number P of processing units.

As exemplified herein, the circuit may be configured to apply fast Fourier transform processing having a size N, in the form N=$2^n$ with n being an integer, to the data stored in the data memory banks, and applying the fast Fourier transform processing having a size N may comprise processing the data in a plurality of FFT computation stages comprising a number n of FFT computation stages, wherein each FFT computation stage comprises a number of FFT computation cycles.

As exemplified herein, the processing units may be configured to:
fetch (e.g., 108, 103), at each of the FFT computation stages, input data from the data memory banks with a burst read memory transaction, fetch (e.g., no, 104), at each of the FFT computation cycles, a respective set of the twiddle factors from the coefficient memory banks,
process the input data and the set of twiddle factors to generate output data, and
store (e.g., 108, 103), at each of the FFT computation stages, the output data into the data memory banks with a burst write memory transaction.

As exemplified herein, the processing units may be configured to fetch, at each of the FFT computation cycles, different twiddle factors in the respective set of twiddle factors from different coefficient memory banks.

As exemplified herein, each of the processing units may comprise a respective coefficient index generation circuit (e.g., $110_0, \ldots, 100_{P-1}$) configured to generate, as a function of a current FFT computation stage and a current FFT computation cycle, a respective index of a twiddle factor for use by the respective processing circuit.

As exemplified herein, the circuit may comprise a coefficient memory controller (e.g., 104) configured to interface the coefficient index generation circuits to the coefficient memory banks.

As exemplified herein, the coefficient memory controller may comprise:
a plurality of communication ports (e.g., $200_0, \ldots, 200_{P-1}$) comprising a number P of communication ports respectively coupled to the coefficient index generation circuits of the processing units,
a plurality of dispatcher circuits (e.g., $202_0, \ldots, 202_{P-1}$) comprising a number P of dispatcher circuits equal to the number P of processing units, the dispatcher circuits being respectively coupled to the communication ports, and
a plurality of merger circuits (e.g., $204_0, \ldots, 204_{P-1}$) comprising a number P of merger circuits equal to the number P of processing units, the merger circuits being respectively coupled to the coefficient memory banks.

As exemplified herein, each of the dispatcher circuits may be coupled to all of the merger circuits in a fully connected network.

As exemplified herein, the processing units may be arranged in an ordered sequence from a first processing unit (e.g., $100_0$) to a last processing unit (e.g., $100_{P-1}$), each of the coefficient index generation circuits in the ordered sequence of processing units may comprise a respective multiplexer circuit (e.g., $40_0, \ldots, 40_{P-1}$) and a respective power-of-2 counter circuit (e.g., $42_0, \ldots, 42_{P-1}$) configured to generate the respective index of a twiddle factor for use by the respective processing circuit, and each of the multiplexer circuits may be configured to pass to the respective power-of-2 counter circuit a signal selected out (e.g., $S_0, \ldots, S_{P-1}$) of a signal output from a preceding multiplexer circuit in the ordered sequence of multiplexer circuits or a signal indicative of the position of the multiplexer circuit in the ordered sequence of multiplexer circuits, as a function of the current FFT computation stage and current FFT computation cycle.

As exemplified herein, the multiplexer circuits arranged in an ordered sequence are selectively couplable in groups of daisy-chained multiplexer circuits, and the groups may have a cardinality which is a function of the current FFT computation stage.

As exemplified herein, the cardinality of the groups of daisy-chained multiplexer circuits may be equal to $2^{stage}$, wherein stage is a progressive number indicative of the current FFT computation stage, with the first FFT computation stage being identified by numeral zero. As exemplified herein, the cardinality of the groups of daisy-chained multiplexer circuits may be limited to the number P of processing units.

As exemplified herein, the respective power-of-2 counter circuit may be configured to update a respective counter register value at each FFT computation cycle. Updating the respective counter register value may comprise adding to a previously stored counter register value an offset value computed as a function of the current FFT computation cycle.

As exemplified herein, a burst length of the burst read memory transactions and the burst write memory transactions may be equal to N/2P, and a burst stride of the burst read memory transactions and the burst write memory transactions may be computed at each FFT computation stage as a function of the number P of processing units.

As exemplified herein, each of the coefficient memory banks may comprise a number N/2P of rows, and a number N/2 of the twiddle factors may be stored without repetition in the plurality of coefficient memory banks according to a low-order interleaving scheme or a standard interleaving scheme.

As exemplified herein, a row having index j of a coefficient memory bank having index i may have stored therein a twiddle factor having index i+JP.

As exemplified herein, the plurality of data memory banks may comprise a number of data memory banks equal to twice the number P of processing units.

As exemplified herein, a method of operating a circuit according to one or more embodiments may comprise:

storing twiddle factors for fast Fourier transform, FFT, processing in the plurality of coefficient memory banks, applying fast Fourier transform processing having a size N, in the form N=$2^n$ with n being an integer, to data stored in the data memory banks, wherein applying the fast Fourier transform processing having a size N may comprise processing the data in a plurality of FFT computation stages comprising a number n of FFT computation stages, wherein each FFT computation stage may comprise a number of FFT computation cycles, fetching, at each of the FFT computation stages, input data from the data memory banks with a burst read memory transaction, fetching, at each of the FFT computation cycles, a respective set of the twiddle factors from the coefficient memory banks, processing in the plurality of processing unit the input data and the set of twiddle factors to generate output data, and storing, at each of the FFT computation stages, the output data into the data memory banks with a burst write memory transaction.

As exemplified herein, fetching the twiddle factors may comprise fetching, at each of the FFT computation cycles, different twiddle factors in the respective set of twiddle factors from different coefficient memory banks.

Without prejudice to the underlying principles, the details and embodiments may vary, even significantly, with respect to what has been described by way of example only, without departing from the extent of protection.

The extent of protection is determined by the annexed claims.

TABLE I

| Architecture Parameters | Description |
| --- | --- |
| Number of instantiated radix-2 processing elements ($100_0$, . . . , $100_{P-1}$) | P = $2^p$ |
| Number of local data memory banks ($M_0$, . . . , $M_{Q-1}$) | Q = 2*P |
| Number of local data memory controllers (103) | 1 |
| Number of ROM memory banks ($105_0$, . . . , $105_{P-1}$) | P |
| Number of ROM controllers (104) | 1 |
| Supported FFT lengths | N = $2^n$ |
| Number of FFT stages | n |
| Number of clock cycles per stage | N/(2*P) |

TABLE II

| #PE | | BURST PARAMETERS | Stage 0 Burst Value | Point index sequence | Stage 1 Burst Value | Point index sequence | Stage n − 1 Burst Value | Point index sequence |
| --- | --- | --- | --- | --- | --- | --- | --- | --- |
| i | DMAR IN0 | START_INDX | i | i, | i >> 1 | i >> 1, | i >> (n − 1) | i >> (n − 1) = 2i, |
|  |  | STRIDE | P | i + P, | P >> 1 | (i >> 1) + (P >> 1), | P >> (n − 1) = 2P | 2i + 2P, |
|  |  | LENGTH | N/(2P) | . . . | N/(2P) | . . . | N/(2P) | . . . |
|  |  | BURST TYPE | INCR |  | INCR |  | INCR |  |
|  | DMAR IN1 | START_INDX | i + N/2 | (i + N/2), | i >> 1 + (N/4) | (i >> 1) + N/4, . . . | i >> (n − 1) + 1 | (i >> n − 1 = 2i) + 1, |
|  |  | STRIDE | P | (i + N/2) + P, | P >> 1 |  | 2P | 2i + 1 + 2P, |
|  |  | LENGTH | N/(2P) | . . . | N/(2P) |  | N/(2P) | . . . |
|  |  | BURST TYPE | INCR |  | INCR |  | INCR |  |
|  | DMAW OUT0 | START_INDX | i | i, | i >> 1 | i >> 1, | i >> (n − 1) | i >> n − 1 = 2i, |
|  |  | STRIDE | P | i + P, | P >> 1 | (i >> 1) + (P >> 1), | P >> (n − 1) = 2P | 2i + 2P, |
|  |  | LENGTH | N/(2P) | . . . | N/(2P) | . . . | N/(2P) | . . . |
|  |  | BURST TYPE | INCR |  | INCR |  | INCR |  |
|  | DMAW OUT1 | START_INDX | i + (N/2) | i + N/2, | i >> 1 + (N/4) | (i >> 1) + N/4, . . . | i >> (n − 1) + 1 | (i >> n − 1 = 2i) + 1, |
|  |  | STRIDE | P | i + N/2 + P, | P >> 1 |  | P >> (n − 1) = 2P | 2i + 1 + 2P, |
|  |  | LENGTH | N/(2P) | . . . | N/(2P) |  | N/(2P) | . . . |
|  |  | BURST TYPE | INCR |  | INCR |  | INCR |  |

TABLE III

N = 64 (n = 6), P = 8 (p = 3)

| | | PE# | | | | | | | |
| --- | --- | --- | --- | --- | --- | --- | --- | --- | --- |
| Stage | Cycle | 0 | 1 | 2 | 3 | 4 | 5 | 6 | 7 |
| 0 | 0 | W0 | W1 | W2 | W3 | W4 | W5 | W6 | W7 |
|  | 1 | W8 | W9 | W10 | W11 | W12 | W13 | W14 | W15 |
|  | 2 | W16 | W17 | W18 | W19 | W20 | W21 | W22 | W23 |
|  | 3 | W24 | W25 | W26 | W27 | W28 | W29 | W30 | W31 |
| 1 | 0 | W0 | W0 | W2 | W2 | W4 | W4 | W6 | W6 |
|  | 1 | W8 | W8 | W10 | W10 | W12 | W12 | W14 | W14 |
|  | 2 | W16 | W16 | W18 | W18 | W20 | W20 | W22 | W22 |
|  | 3 | W24 | W24 | W26 | W26 | W28 | W28 | W30 | W30 |

TABLE III-continued

N = 64 (n = 6), P = 8 (p = 3)

| Stage | Cycle | \#PE 0 | 1 | 2 | 3 | 4 | 5 | 6 | 7 |
|---|---|---|---|---|---|---|---|---|---|
| 2 | 0 | W0 | W0 | W0 | W0 | W4 | W4 | W4 | W4 |
|   | 1 | W8 | W8 | W8 | W8 | W12 | W12 | W12 | W12 |
|   | 2 | W16 | W16 | W16 | W16 | W20 | W20 | W20 | W20 |
|   | 3 | W24 | W24 | W24 | W24 | W28 | W28 | W28 | W28 |
| 3 | 0 | W0 | W0 | W0 | W0 | W0 | W0 | W0 | W0 |
|   | 1 | W8 | W8 | W8 | W8 | W8 | W8 | W8 | W8 |
|   | 2 | W16 | W16 | W16 | W16 | W16 | W16 | W16 | W16 |
|   | 3 | W24 | W24 | W24 | W24 | W24 | W24 | W24 | W24 |
| 4 | 0 | W0 | W0 | W0 | W0 | W0 | W0 | W0 | W0 |
|   | 1 | W0 | W0 | W0 | W0 | W0 | W0 | W0 | W0 |
|   | 2 | W16 | W16 | W16 | W16 | W16 | W16 | W16 | W16 |
|   | 3 | W16 | W16 | W16 | W16 | W16 | W16 | W16 | W16 |
| 5 | 0 | W0 | W0 | W0 | W0 | W0 | W0 | W0 | W0 |
|   | 1 | W0 | W0 | W0 | W0 | W0 | W0 | W0 | W0 |
|   | 2 | W0 | W0 | W0 | W0 | W0 | W0 | W0 | W0 |
|   | 3 | W0 | W0 | W0 | W0 | W0 | W0 | W0 | W0 |

TABLE IV

N = 32 (n = 5), P = 8 (p = 3)

| Stage | Cycle | \#PE 0 | 1 | 2 | 3 | 4 | 5 | 6 | 7 |
|---|---|---|---|---|---|---|---|---|---|
| 0 | 0 | W0 | W1 | W2 | W3 | W4 | W5 | W6 | W7 |
|   | 1 | W8 | W9 | W10 | W11 | W12 | W13 | W14 | W15 |
| 1 | 0 | W0 | W0 | W2 | W2 | W4 | W4 | W6 | W6 |
|   | 1 | W8 | W8 | W10 | W10 | W12 | W12 | W14 | W14 |
| 2 | 0 | W0 | W0 | W0 | W0 | W4 | W4 | W4 | W4 |
|   | 1 | W8 | W8 | W8 | W8 | W12 | W12 | W12 | W12 |
| 3 | 0 | W0 | W0 | W0 | W0 | W0 | W0 | W0 | W0 |
|   | 1 | W8 | W8 | W8 | W8 | W8 | W8 | W8 | W8 |
| 4 | 0 | W0 | W0 | W0 | W0 | W0 | W0 | W0 | W0 |
|   | 1 | W0 | W0 | W0 | W0 | W0 | W0 | W0 | W0 |

TABLE V

N = 32 (n = 5), P = 4 (p = 2)

| Stage | Cycle | \#PE 0 | 1 | 2 | 3 |
|---|---|---|---|---|---|
| 0 | 0 | W0 | W1 | W2 | W3 |
|   | 1 | W4 | W5 | W6 | W7 |

TABLE V-continued

N = 32 (n = 5), P = 4 (p = 2)

| Stage | Cycle | \#PE 0 | 1 | 2 | 3 |
|---|---|---|---|---|---|
|   | 2 | W8 | W9 | W10 | W11 |
|   | 3 | W12 | W13 | W14 | W15 |
| 1 | 0 | W0 | W0 | W2 | W2 |
|   | 1 | W4 | W4 | W6 | W6 |
|   | 2 | W8 | W8 | W10 | W10 |
|   | 3 | W12 | W12 | W14 | W14 |
| 2 | 0 | W0 | W0 | W0 | W0 |
|   | 1 | W4 | W4 | W4 | W4 |
|   | 2 | W8 | W8 | W8 | W8 |
|   | 3 | W12 | W12 | W12 | W12 |
| 3 | 0 | W0 | W0 | W0 | W0 |
|   | 1 | W0 | W0 | W0 | W0 |
|   | 2 | W8 | W8 | W8 | W8 |
|   | 3 | W8 | W8 | W8 | W8 |
| 4 | 0 | W0 | W0 | W0 | W0 |
|   | 1 | W0 | W0 | W0 | W0 |
|   | 2 | W0 | W0 | W0 | W0 |
|   | 3 | W0 | W0 | W0 | W0 |

TABLE VI

ROM bank \#i with $0 \leq i < P - 1$
ROM row \#j with $0 \leq j < (N/2*P) - 1$

| ROW\# | Value |
|---|---|
| 0 | $W_i$ |
| ... | ... |
| j | $W_{i + jP}$ |
| ... | ... |
| (N/2*P) − 1 | $W(i + (N/2) - P)$ |

TABLE VII

P = 8 (p = 3)

| | Multiplexer index i ($40_i$) | | | | | | | |
|---|---|---|---|---|---|---|---|---|
| | 0 | 1 | 2 | 3 | 4 | 5 | 6 | 7 |
| Selection signal bit index j ($S_j$) | — | 0 | 1 | 0 | 2 | 0 | 1 | 0 |

TABLE VIII

P = 16 (p = 4)

| | Multiplexer index i ($40_i$) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Selection signal bit index j ($S_j$) | — | 0 | 1 | 0 | 2 | 0 | 1 | 0 | 3 | 0 | 1 | 0 | 2 | 0 | 1 | 0 |

What is claimed is:

1. A circuit comprising:
    a plurality of processing units comprising a number P of processing units;
    a plurality of data memory banks configured to store data; and
    a plurality of coefficient memory banks configured to store twiddle factors for fast Fourier transform (FFT) processing, the plurality of coefficient memory banks comprising a number P of coefficient memory banks equal to the number P of processing units;
    wherein the circuit is configured to apply the FFT processing having a size N, in a form $N=2^n$ with n being an integer, to the data stored in the data memory banks, and wherein applying the FFT processing having the size N comprises processing the data in a plurality of FFT computation stages comprising a number n of FFT computation stages, wherein each FFT computation stage comprises a number of FFT computation cycles;
    wherein the processing units are configured to:
        fetch at each of the FFT computation stages, input data from the data memory banks with a burst read memory transaction;
        compute, at each of the FFT computation cycles, twiddle factor indexes;
        fetch, at each of the FFT computation cycles, based on the twiddle factor indexes, different twiddle factors in a respective set of the twiddle factors from different coefficient memory banks of the coefficient memory banks;
        process the input data and the set of twiddle factors to generate output data; and
        store, at each of the FFT computation stages, the output data into the data memory banks with a burst write memory transaction.

2. The circuit of claim 1, further comprising:
    a local control unit communicatively coupled to the plurality of processing units, and configured to provide control signals to control the computation of the twiddle factor indexes.

3. The circuit of claim 1, further comprising:
    a respective coefficient index generation circuit in each of the processing units, configured to generate a respective twiddle factor index; and
    a coefficient memory controller configured to interface the coefficient index generation circuits to the coefficient memory banks.

4. The circuit of claim 1, wherein the processing units configured to compute the twiddle factor indexes further comprise the processing units configured to:
    check whether a current value of a variable stage, where stage identifies a current FFT computation stage, is lower than or equal to a value p, where $p=\log_2 P$;
    as a result of the check being positive, first divide a number i, where i identifies a current processing unit, with i ranging from 0 to P−1, by a number $2^{stage}$, and check whether a remainder of the first division is equal to zero; and
    as a result of the check being negative, second divide a number cycle, where cycle identifies a current FFT computation cycle, by a number $2^{stage-p}$, and check whether a remainder of the second division is equal to zero.

5. The circuit of claim 4, wherein the processing units are further configured to initialize stage at zero and count stage up to n−1, where $n=\log_2 N$.

6. The circuit of claim 4, wherein the processing units configured to compute the twiddle factor indexes further comprise the processing units configured to:
    as a result of the remainder of the first division being zero, compute a respective twiddle factor index currently required by processing unit i according to $index_i = i + cycle*P$; and
    as a result of the remainder of the first division not being zero, compute the respective twiddle factor index currently required by processing unit i according to $index_i = index_{i-1}$.

7. The circuit of claim 6, wherein the processing units are further configured to initialize cycle at zero at a beginning of each FFT stage and count cycle up to $N/(2P)-1$.

8. The circuit of claim 4, wherein the processing units configured to compute the twiddle factor indexes further comprise the processing units configured to:
    as a result of the remainder of the second division being zero, compute a respective twiddle factor index currently required by processing unit i according to $index_i = cycle*P$; and
    as a result of the remainder of the second division not being zero, compute the twiddle factor indexes currently required by all the processing units by retaining the same indexes computed at a previous computation cycle.

9. A method of operating a circuit, the method comprising:
    storing twiddle factors for fast Fourier transform (FFT) processing in a plurality of coefficient memory banks;
    applying the FFT processing having a size N, in a form $N=2n$ with n being an integer, to data stored in a plurality of data memory banks, the applying the FFT processing having the size N comprising processing the data in a plurality of FFT computation stages comprising a number n of FFT computation stages, each FFT computation stage comprising a number of FFT computation cycles;
    fetching, at each of the FFT computation stages, input data from the data memory banks with a burst read memory transaction;
    computing, at each of the FFT computation cycles, twiddle factor indexes;
    fetching, at each of the FFT computation cycles, based on the twiddle factor indexes, different twiddle factors in a respective set of the twiddle factors from different coefficient memory banks of the coefficient memory banks;
    processing, in a plurality of processing units, the input data and the set of twiddle factors to generate output data; and
    storing, at each of the FFT computation stages, the output data into the data memory banks with a burst write memory transaction.

10. The method of claim 9, further comprising:
    providing, by a local control unit, control signals to control the computing of the twiddle factor indexes.

11. The method of claim 9, wherein computing the twiddle factor indexes comprises:
    checking whether a current value of a variable stage, where stage identifies a current FFT computation stage, is lower than or equal to a value p, where $p=\log_2 P$.

12. The method of claim 11, wherein computing the twiddle factor indexes further comprises:
    in response to the checking being positive, first dividing a number i, where i identifies a current processing unit, with i ranging from 0 to P−1, by a number $2^{stage}$, and checking whether a remainder of the first division is equal to zero.

13. The method of claim 12, wherein computing the twiddle factor indexes comprises initializing stage at zero and counting stage up to n−1, where n=log$_2$N.

14. The method of claim 12, wherein computing the twiddle factor indexes further comprises:
   in response to the remainder of the first division being zero, computing a respective twiddle factor index currently required by processing unit i according to index$_i$=i+cycle*P.

15. The method of claim 12, wherein computing the twiddle factor indexes further comprises:
   in response to the remainder of the first division not being zero, computing a respective twiddle factor index currently required by processing unit i according to index$_i$=index$_{i-1}$.

16. The method of claim 11, wherein computing the twiddle factor indexes further comprises:
   in response to the checking being negative, second dividing a number cycle, where cycle identifies a current FFT computation cycle, by a number $2^{stage-p}$, and checking whether a remainder of the second division is equal to zero.

17. The method of claim 16, wherein computing the twiddle factor indexes comprises initializing stage at zero and counting stage up to n−1, where n=log$_2$N.

18. The method of claim 16, wherein computing the twiddle factor indexes further comprises initializing cycle at zero at a beginning of each FFT stage and counting cycle up to N/(2P)−1.

19. The method of claim 16, wherein computing the twiddle factor indexes further comprises:
   in response to the remainder of the second division being zero, computing a respective twiddle factor index currently required by processing unit i according to index$_i$=cycle*P.

20. The method of claim 16, wherein computing the twiddle factor indexes further comprises:
   in response to the remainder of the second division not being zero, computing the twiddle factor indexes currently required by all the processing units by retaining the same indexes computed at a previous computation cycle.

* * * * *

UNITED STATES PATENT AND TRADEMARK OFFICE
CERTIFICATE OF CORRECTION

PATENT NO. : 11,675,720 B2
APPLICATION NO. : 17/811209
DATED : June 13, 2023
INVENTOR(S) : Re Fiorentin et al.

It is certified that error appears in the above-identified patent and that said Letters Patent is hereby corrected as shown below:

In the Claims

In Column 18, in Claim 9, Line 33, delete "N=2n" and insert -- $N=2^n$ --, therefor.

Signed and Sealed this
Twelfth Day of September, 2023

Katherine Kelly Vidal
*Director of the United States Patent and Trademark Office*